(12) United States Patent
Barrett et al.

(10) Patent No.: US 8,010,682 B2
(45) Date of Patent: Aug. 30, 2011

(54) EARLY COHERENCY INDICATION FOR RETURN DATA IN SHARED MEMORY ARCHITECTURE

(75) Inventors: Wayne Melvin Barrett, Rochester, MN (US); David Alan Shedivy, Rochester, MN (US); Kenneth Michael Valk, Rochester, MN (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 2009 days.

(21) Appl. No.: 11/023,706

(22) Filed: Dec. 28, 2004

(65) Prior Publication Data

US 2006/0143403 A1 Jun. 29, 2006

(51) Int. Cl.
*G06F 15/16* (2006.01)
*G06F 13/00* (2006.01)
(52) U.S. Cl. ........................ 709/228; 711/141
(58) Field of Classification Search .................. 709/228; 707/141
See application file for complete search history.

(56) References Cited

U.S. PATENT DOCUMENTS

| | | | | |
|---|---|---|---|---|
| 5,890,217 | A * | 3/1999 | Kabemoto et al. | 711/141 |
| 5,911,051 | A * | 6/1999 | Carson et al. | 710/107 |
| 6,108,764 | A * | 8/2000 | Baumgartner et al. | 712/28 |
| 6,374,331 | B1 | 4/2002 | Janakiraman et al. | 711/141 |
| 6,463,510 | B1 * | 10/2002 | Jones et al. | 711/138 |
| 6,631,448 | B2 * | 10/2003 | Weber | 711/141 |
| 6,738,836 | B1 | 5/2004 | Kessler et al. | |
| 6,934,814 | B2 * | 8/2005 | Glasco et al. | 711/141 |
| 6,954,829 | B2 | 10/2005 | Beers et al. | |
| 7,124,253 | B1 | 10/2006 | Wright | |
| 7,216,205 | B2 | 5/2007 | Greer et al. | |
| 2001/0034815 | A1 * | 10/2001 | Dugan et al. | 711/118 |
| 2002/0083244 | A1 * | 6/2002 | Hammarlund et al. | 710/107 |
| 2003/0041216 | A1 * | 2/2003 | Rosenbluth et al. | 711/141 |
| 2003/0079085 | A1 | 4/2003 | Ang | |
| 2003/0196047 | A1 * | 10/2003 | Kessler et al. | 711/147 |
| 2004/0268054 | A1 | 12/2004 | Peir et al. | |
| 2005/0071563 | A1 * | 3/2005 | Kuttanna et al. | 711/119 |
| 2005/0154805 | A1 * | 7/2005 | Steely et al. | 710/52 |
| 2007/0055826 | A1 | 3/2007 | Morton et al. | |

OTHER PUBLICATIONS

Azimi, M et al., "Scalability Port: A Coherent Interface for Shared memory Multiprocessors", High Performance Interconnects IEEE, Aug. 21, 2002, pp. 65-70.*
Azimi, M. et al., "Scalability Port: A Coherent Interface for Shared memory Multiprocessors," High Performance Interconnects IEEE, (Aug. 21, 2002), pp. 65-70.
Lilja, D.J. "Cache Coherance in Large Scale Shared Memory Multiprocessors: Issues and Comparisons," ACM Computing Surveys, (Sep. 2003), pp. 303-338.

(Continued)

*Primary Examiner* — Vivek Srivastava
*Assistant Examiner* — William J Goodchild
(74) *Attorney, Agent, or Firm* — Wood, Herron & Evans, LLP (57) ABSTRACT

In a shared memory architecture, early coherency indication is used to notify a communications interface, prior to the data for a memory request is returned, and prior to updating a coherency directory in response to the memory request, that the return data can be used by the communications interface when it is received thereby from a source of the return data. By doing so, the communications interface can often begin forwarding the return data over its associated communication link with little or no latency once the data is retrieved from its source. In addition, the communications interface is often no longer required to wait for updating of the coherency directory to complete prior to forwarding the return data over the communication link. As such, the overall latency for handling the memory request is typically reduced.

17 Claims, 5 Drawing Sheets

OTHER PUBLICATIONS

Ender, Bilir E., et al. "Multicast Snooping: A New Coherance Method Using A Multicase Address Network," Computer Architecture News, (May 1999), pp. 294-304.

Tracey et al., A Hardware Description Language for Processor Based Digital Systems, 1982, IEEE 19th Design Automation Conference, pp. 330-337.

* cited by examiner

EARLY COHERENCY INDICATION FOR RETURN DATA IN SHARED MEMORY ARCHITECTURE

FIELD OF THE INVENTION

The invention relates to computers and data processing systems, and in particular to communicating data in a data processing system incorporating a shared memory architecture.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a hardware standpoint, computers increasingly rely on multiple processors to provide increased workload capacity. Furthermore, some processors have been developed that support the ability to execute multiple threads in parallel, effectively providing many of the same performance gains attainable through the use of multiple processors.

A significant bottleneck that can occur in a multi-processor computer, however, is associated with the transfer of data to and from each processor, often referred to as communication cost. Many computers rely on a main memory that serves as the principal working storage for the computer. Retrieving data from a main memory, and storing data back into a main memory, however, is often required to be performed at a significantly slower rate than the rate at which data is transferred internally within a processor. Often, intermediate buffers known as caches are utilized to temporarily store data from a main memory when that data is being used by a processor. These caches are often smaller in size, but significantly faster, than the main memory. Caches often take advantage of the temporal and spatial locality of data, and as a result, often significantly reduce the number of comparatively-slower main memory accesses occurring in a computer and decrease the overall communication cost experienced by the computer.

Often, all of the processors in a computer will share the same main memory, an architecture that is often referred to as Symmetric Multiprocessing (SMP). One limitation of such computers, however, occurs as a result of the typical requirement that all communications between the processors and the main memory occur over a common bus or interconnect. As the number of processors in a computer increases, the communication traffic to the main memory becomes a bottleneck on system performance, irrespective of the use of intermediate caches.

To address this potential bottleneck, a number of computer designs rely on another shared memory architecture referred to as Non-Uniform Memory Access (NUMA), whereby multiple main memories are essentially distributed across a computer and physically grouped with sets of processors and caches into physical subsystems or modules, also referred to herein as "nodes". The processors, caches and memory in each node of a NUMA computer are typically mounted to the same circuit board or card to provide relatively high speed interaction between all of the components that are "local" to a node. Often, a "chipset" including one or more integrated circuit chips, is used to manage data communications between the processors and the various components in the memory architecture. The nodes are also coupled to one another over a network such as a system bus or a collection of point-to-point interconnects, thereby permitting processors in one node to access data stored in another node, thus effectively extending the overall capacity of the computer. Memory access, however, is referred to as "non-uniform" since the access time for data stored in a local memory (i.e., a memory resident in the same node as a processor) is often significantly shorter than for data stored in a remote memory (i.e., a memory resident in another node).

Irrespective of the type of architecture used, however, the latency of memory accesses is often a significant factor in the overall performance of a computer. As a result, significant efforts have been directed to obtaining the smallest memory latency possible for any given memory request.

In a computer where processors are coupled to a memory system via an intermediate chipset, read or load requests typically must be forwarded to the chipset via a processor bus that interconnects the requesting processor to the chipset, which then determines where the requested data currently resides (e.g., in main memory, in a shared cache, in the local cache of another processor, or, in the case of a NUMA system, in a memory or cache in a different node). The determination is often made by performing a lookup of a coherency directory, which may be centralized, or in some designs, distributed to multiple points in the architecture. In addition, an update to the coherency directory may also be made based upon the fact that the requested data will be resident in the requesting processor after completion of the request.

Based upon the location of the requested data, the chipset will then initiate the retrieval of the requested data, and once the data is returned, the data is typically stored in a buffer in the chipset. Thereafter, a communications interface in the chipset, e.g., the processor bus interface that couples to the requesting processor over the processor bus, will use the return data by retrieving the data from the central buffer and driving the return data to the requesting processor over the processor bus. The latency of the request is typically measured from the time that the request is forwarded across a processor bus by a requesting processor, until the return data is driven back across the processor bus to the requesting processor.

One operation that can affect the latency of a memory request in conventional designs is associated with updating the coherency directory. Specifically, in many designs, the data returned from a memory or other source, and temporarily stored in a chipset buffer, is not forwarded to the requesting processor by the processor bus interface until after the coherency directory is updated to reflect the new status of the relevant data. This is typically due to the need to verify that the memory request will not need to be canceled prior to returning the data to the requesting processor. In many such designs, therefore, the data being returned waits in the chipset buffer until a confirmation is received from the coherency directory indicating that the data is ready to be forwarded to the requesting processor.

In a multinode system such as a NUMA-based system, a similar issue arises with respect to communicating data requested by another node over the communication link between the nodes. Some conventional designs, for example, utilize scalability port interfaces in a chipset to provide high speed point-to-point interconnections between pairs of nodes. From the perspective of the chipset in a node, the handling of memory requests received over a scalability port is handled much like a memory request from a local processor, with the primary difference being that the communications protocol used on the scalability port is often packet-based, and requires that data be formatted into specific packets of information prior to being sent to another node via the scalability port. From the perspective of performing a lookup of a coherency directory to identify the source of the requested data, updating the coherency directory, retrieving the requested data from the source, storing the return data in a buffer, and waiting for confirmation from a coherency directory, there is little difference between memory requests originated by local processors and those originated by remote nodes.

By requiring the data requested by a processor or another node in a multinode system to wait in the buffer, several cycles of additional latency may be introduced. Furthermore, given the pipelined nature of most memory systems, this requirement typically requires larger buffers to enable the data for multiple requests to be retained in the chipset while awaiting confirmation from the coherency directory. Larger buffers often lead to increased cost and complexity for a given design, and as such, it is typically desirable to minimize the amount of buffering required in a chipset whenever possible.

Therefore, a significant need continues to exist for a manner of minimizing the latency of memory requests in a shared memory data processing system.

SUMMARY OF THE INVENTION

The invention addresses these and other problems associated with the prior art by utilizing early coherency indication to notify a communications interface, prior to the data for a memory request is returned, and prior to updating a coherency directory in response to the memory request, that the return data can be used by the communications interface when it is received thereby from a source of the return data. By doing so, the communications interface can often begin forwarding the return data over its associated communication link with little or no latency once the data is retrieved from its source. In addition, the communications interface is often no longer required to wait for updating of the coherency directory to complete prior to forwarding the return data over the communication link. As such, the overall latency for handling the memory request is typically reduced.

Therefore, consistent with one aspect of the invention, a communications interface that is configured to communicate return data over a communications link in response to a request, and a coherency directory that is configured to store coherency information that identifies a source of the return data for the request, may be coupled to control logic that is configured to, in response to the request, perform a lookup of the coherency directory to determine the source of the return data and update the coherency directory. Furthermore, the control logic may be configured to indicate to the communications interface, prior to updating the coherency directory, that the return data can be used by the communications interface when received thereby from the source of the return data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed and illustrated hereinafter utilize early coherency indication to enable a communications interface to anticipate a data return from a source, and based upon that anticipation, prepare for communication of the return data, e.g., by planning out and executing any bus arbitration/signaling, preparing a data response packet, etc., prior to data return, such that when the data is returned from its source, it can flow directly to the communications link with minimal latency and with a minimal amount of buffering.

Embodiments consistent with the invention generally reduce latency and buffering requirements through two related mechanisms. First, the update of a coherency directory is treated as a separate step from performing a lookup of the coherency directory, and furthermore, is removed from the critical path for the processing of the memory request. By doing so, the update to the coherency directory is essentially made independent of enabling the communications interface to communicate the return data over the communications link based upon a lookup of the coherency directory. As such, any latency caused by updating the coherency directory will typically not affect the latency of a memory request.

Second, an early indication, referred to herein as an early coherency indication, is provided to the communications interface, indicating that the data can be used by the communications interface and forwarded over its associated communications link, whenever the data is received by the communications interface from the source of the return data. Typically, this indication may also indicate that the data will arrive at a predetermined time, e.g., in a fixed number of cycles. By doing so, this allows the communications interface to begin arbitrating for the bus and line up the data return phase, and/or preparing a data response packet or otherwise beginning formatting the data for communication over the communications link, prior to the data actually being made available to the communications interface.

A communications interface consistent with the invention may include practically any logic suitable for communicating data to be returned in response to a memory request to the desired destination for that memory request. For example, a communications interface may include a bus interface, e.g., a processor bus interface, that communicates with one or more processors over a processor bus. As another example, a communications interface may include an internodal interface, e.g., as used in a multinode data processing system to communicate data between multiple nodes. One specific type of internodal interface, for example, is a scalability port interface.

A source of return data may include any memory storage or component housing the same that is capable of storing data and returning that data in response to a memory request. For example, in the multinode implementation described hereinafter, the source of return data may include the main memory storage for a particular node, any cache memory maintained within or managed by a chipset in that node, and any processor (or local cache therefor) that is resident in the node, as well as any of such components that may be resident on a different node altogether.

An early coherency indication may indicate that data can be used by a communications interface, e.g., when it can be ascertained that the request will complete. For example, in the case of a speculative request such as a fastpath memory read, a memory request may be forwarded to main memory prior to knowing whether that request will complete. In a multinode system, for example, a speculative request may not complete if the coherency directory determines that the requested data is stored in a remote node. Also, a request may not complete if it is determined that another request in process is directed to the same address or cache line (i.e., a collision with another request). Other factors may affect whether a request can complete in other embodiments consistent with the invention.

Figure 1:
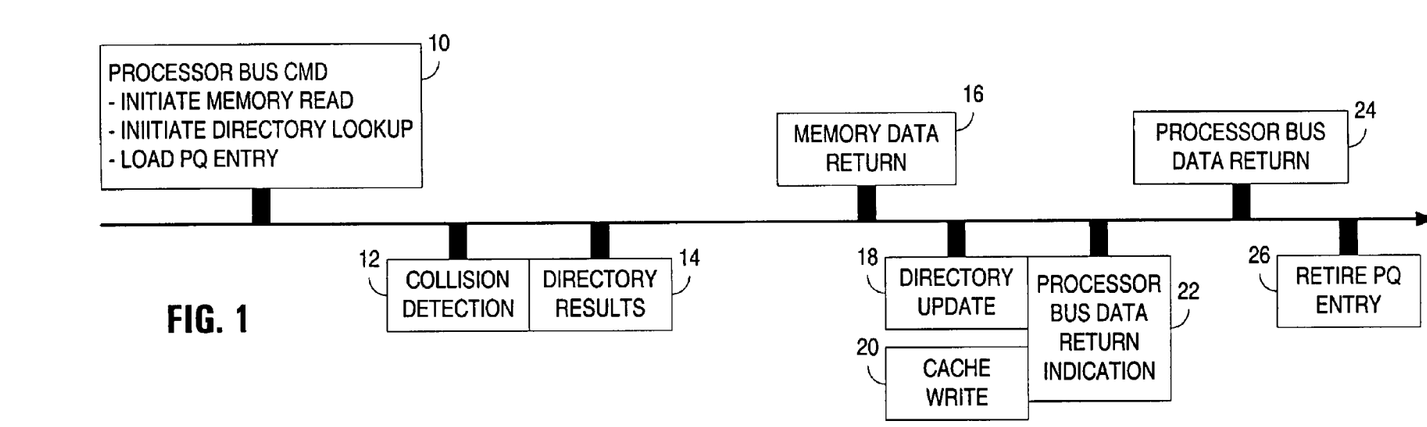
FIG. 1 is a functional timing diagram illustrating the relative timings of various steps in a conventional memory transaction in a computer system implementing a shared memory.
Figure 2:
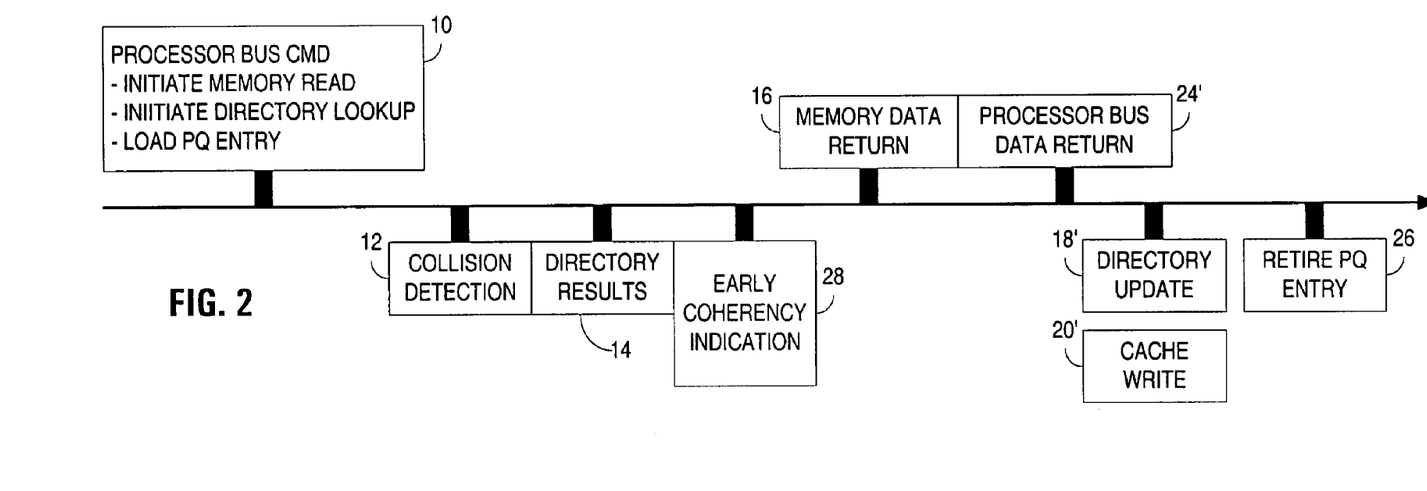
FIG. 2 is a functional timing diagram illustrating the relative timings of various steps in a memory transaction in a computer system implementing a shared memory and utilizing early coherence indication in a manner consistent with the invention.

Turning now to the Drawings, wherein like numbers denote like parts throughout the several views, FIGS. 1 and 2 respectively illustrate the handling of an exemplary memory request issued by a processor in the chipsets of a conventional data processing system and a data processing system implementing early coherency indication consistent with the invention, where it is assumed that the memory request will be fulfilled from a main memory. It will be appreciated that the timings of the various operations illustrated in FIGS. 1 and 2 are relative in nature, and that no specific timings should be implied by the specific positions of the blocks in either figure.

As shown in block 10 of FIG. 1, a processor read request, issued as a processor bus command, is received by a chipset, resulting in the initiation of a memory read and a directory lookup, as well as the loading of a pending queue (PQ) entry, which is used to track the progress of the command throughout its lifespan. Some period of time later, the result of a collision detection operation is returned as illustrated in block 12, as is the result of a coherency directory lookup, as illustrated in block 14. The data is then returned from the memory as illustrated in block 16, and once the data is returned, the coherency directory is updated, and if necessary, the data is written to a cache in the chipset, as illustrated in blocks 18 and 20. In the conventional design, once the coherency directory is updated, a processor bus data return indication is made to the processor bus interface as illustrated in block 22, and some time thereafter, e.g., after the processor bus interface prepares the return data and arbitrates for the processor bus, the processor bus interface initiates the transfer of the return data over the processor bus, as illustrated in block 24. Once the return data is transferred over the processor bus, the PQ entry for the command can be retired, as illustrated in block 26, and processing of the command is complete.

In contrast, embodiments consistent with the invention provide an early coherence indication to the processor bus interface that the return data can be used by the communications interface and forwarded over its associated communications link when the data becomes available. As shown in FIG. 2, for example, early coherence indication may be implemented by providing an early coherency indication as illustrated in block 28, which occurs after the results of collision detection and lookup of the coherency directory have been returned, but also prior to updating the coherency directory, and optionally writing to the chipset cache, as illustrated in blocks 18' and 20'. By providing the early indication to the processor bus interface, the processor bus interface is able to begin arbitrating for the processor bus and otherwise preparing for the return of data, such that once the data is returned from memory as illustrated in block 16, the data may be returned over the processor bus at a much earlier time, as represented by block 24'. Moreover, given the updating of the coherency directory is now outside of the critical path for processing the memory request, the updating of the directory, and optional writing to the chipset cache, may be delayed if desired, as illustrated in blocks 18' and 20'. Consequently, it can be seen that the overall latency of the request, from when it is first placed on the processor bus until the return data is returned back over the processor bus, is reduced from that of conventional designs.

Figure 3:
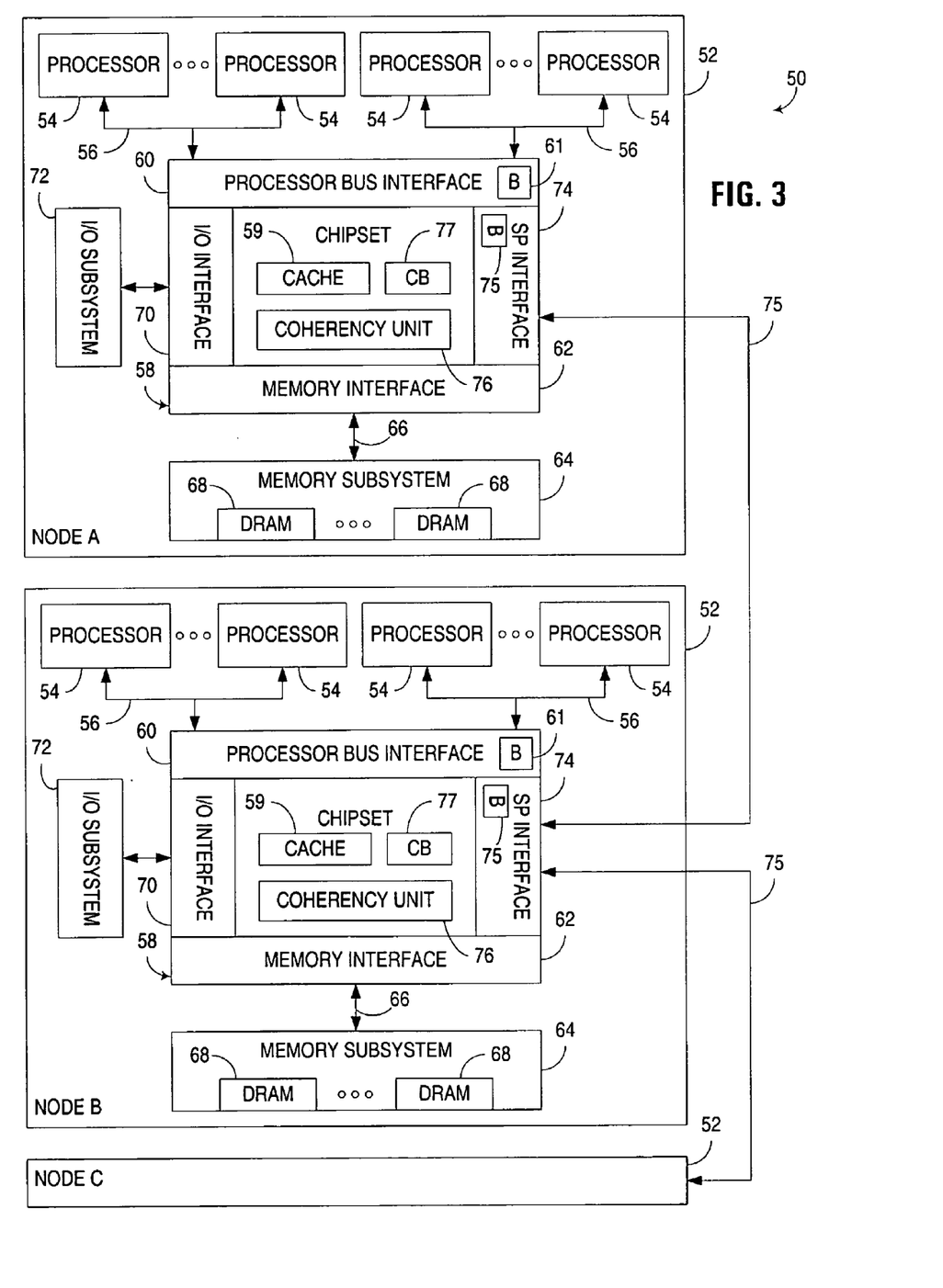
FIG. 3 is a block diagram of a multinode computer system suitable for utilizing early coherency indication in a manner consistent with the invention.

Now turning to an exemplary implementation of a data processing system incorporating early coherency indication, FIG. 3 illustrates a multinode computer 50 that represents one suitable environment within which the herein-described functionality may be implemented in a manner consistent with the invention. Computer 50 generically represents, for example, any of a number of multi-user computers such as a network server, a midrange computer, a mainframe computer, etc. However, it should be appreciated that the invention may be implemented in practically any device capable of utilizing a data bus that serves multiple memory requesters, including other computers and data processing systems, e.g., in single-user computers such as workstations, desktop computers, portable computers, and the like, or in other programmable electronic devices (e.g., incorporating embedded controllers and the like), such as set top boxes, game machines, etc.

Computer 50, being implemented as a multinode computer, includes a plurality of nodes 52, each of which generally including one or more processors 54 coupled to one or more system or processor buses 56. Also coupled to each of processor buses 24 is a chipset 58 incorporating a chipset cache 59, a processor bus interface 60, and a memory interface 62, which connects to a memory subsystem 64 over a memory bus 66. Memory subsystem typically includes a plurality of memory devices, e.g., DRAM's 68, which provides the main memory for each node 52.

For connectivity with peripheral and other external devices, chipset 58 also includes an input/output interface 70 providing connectivity to an I/O subsystem 72. Furthermore, to provide internodal connectivity, an internodal interface, e.g., a scalability port interface 74, is provided in each node to couple via a communications link 75 to one or more other nodes 52. Chipset 58 also typically includes a number of buffers resident therein. Relevant to the discussion hereinafter, for example, is a central buffer 77, as well as one or more dedicated buffers 61, 75 respectively disposed in processor bus interface 60 and scalability port interface 74.

Chipset 58 also includes control logic referred to herein as a coherency unit 76 to manage the processing of memory requests provided to the chipset by processors 54 and/or remote nodes 52 over a scalability port interconnect 75. It is within chipset 58 that early coherence indication is implemented in the embodiment of FIG. 3. Moreover, while other implementations will be envisioned, the embodiment described hereinafter provides early coherence indication as an optional mode of operation for the chipset, and furthermore, supports early coherence indication for data being returned in response to requests issued both by processors on the same node (where the data is to be returned over a processor bus) and processors on a different node (where the data is to be returned over the scalability port). Furthermore, in the embodiment discussed hereinafter, it will be appreciated that requests issued to a chipset may be fulfilled by a remote node via the scalability port, via the main memory located on the node, via a cache in the chipset, or in another processor on the local node, depending upon the location of the requested data.

It will be appreciated that multiple ports or interfaces of any given type may be supported in chipset 58. As shown in FIG. 3, for example, it may be desirable to support multiple processor buses (or bus segments) in each node, which, as will be more apparent below, may result in the need to source data requested by a processor on one processor bus by communicating the data from a processor on another processor bus.

Furthermore, the various interfaces supported by chipset 58 may implement any number of known protocols. For example, chipset 58 may be compatible with the processor bus protocol for the Xeon line of processors from Intel Corporation. It will be appreciated however that the principles of the invention apply to other computer implementations, including other multinode designs, single node designs, and other designs utilizing split transaction buses and/or protocols.

Chipset 58 may be implemented using one or more integrated circuit devices, and may be used to interface system bus 24 with additional electronic components, e.g., graphics controllers, sound cards, firmware, service processors, etc. It should therefore be appreciated that the term chipset may describe a single integrated circuit chip that implements the functionality described herein, and may even be integrated in whole or in part into another electronic component such as a processor chip.

Computer 50, or any subset of components therein, may be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more logic circuits that circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Figure 4:
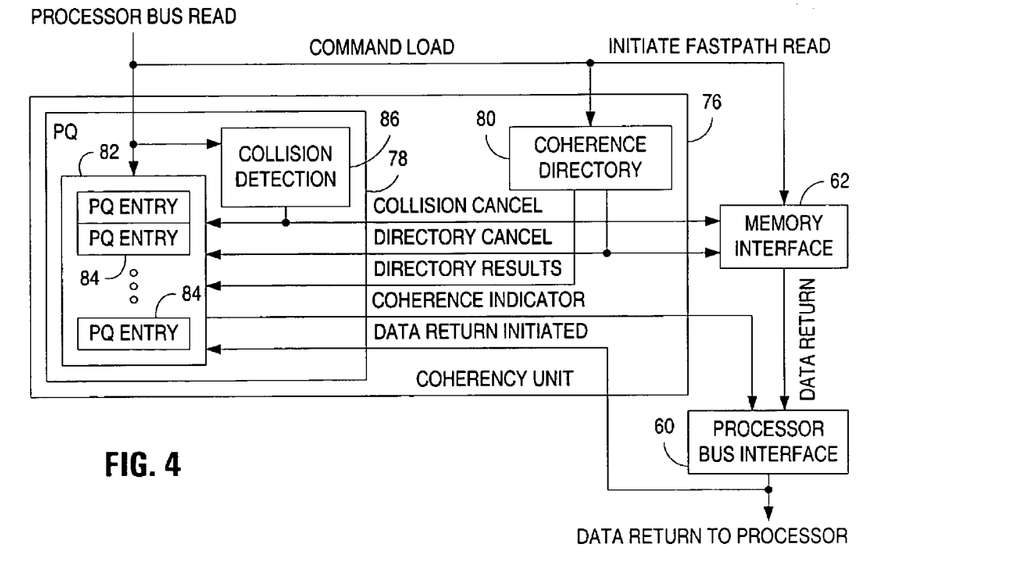
FIG. 4 is a block diagram illustrating the interconnections between the coherency unit, memory interface and processor bus interface in the chipset of FIG. 3.

FIG. 4 illustrates in greater detail the interconnections between coherency unit 76, memory interface 62, and processor bus interface 60 in chipset 58, specifically with regard to handling processor-initiated memory requests forwarded to the chipset over one of processor buses 56. Coherency unit 76 includes a pending queue 78 and a coherence directory 80.

Pending queue (PQ) 78 includes control logic 82 incorporating an array of PQ entries 84, coupled to a collision detection block 86. Each PQ entry is configured to store status information for a pending command or request being processed by the chipset. Additionally included in each PQ entry utilized in the illustrated embodiment are status fields configured to indicate whether (1) the processor bus interface has been provided with an early coherence indication, (2) the scalability port interface has been provided with an early coherence indication, (3) the return data has been forwarded to the processor bus but the coherence directory still needs to be updated, and (4) the return data has been forwarded to the scalability port but the coherence directory still needs to be updated.

Pending queue 78 typically tracks the status of a command or request throughout its lifetime. Typically, this will include receiving the command or request from the processor bus or scalability port interface, determining retry/collision information, receiving directory results to determine where the latest copy of the requested cache line can be found, ensuring that the requested data is obtained by either allowing the fastpath memory read complete, cancelling the fastpath memory read and issuing a new request to another processor bus, or cancelling the memory fastpath request and issuing requests over the scalability port for processor sourced commands, ensuring the data return has occurred, providing notification to the requester that data is available, and ensuring the requester has consumed the data. Of note, when early coherency indication is used, the notification provided that data is available is typically performed after receiving the directory results, rather than waiting until after the data return has occurred.

Collision detection block 86 is configured to compare the address or cache line associated with a new request to those of the pending requests stored in the array of PQ entries. Any new request that is directed to the same address or cache line as a pending request is considered to "collide" with the pending request, and will be canceled and retried at a later time. From the perspective of the new request, an indication from the collision detection that no collisions exist is a prerequisite for providing the early coherence indication. Moreover, from the perspective of a pending request, the fact that later requests that are directed to the same address or cache line will generate collisions ensures that the pending request will not need to be canceled and retried, and as such, the collision detection operates as a guard on the request during the period of time between when the return data for the request is being returned and when the coherence directory is updated as a result of the request. By protecting a pending request in such a manner, it can be assured that a request that will be serviced by the local node, and that does not raise any collisions with other requests, will be able to complete.

Coherence directory 80 stores coherence information related to the associated node, e.g., tracking all cache lines currently cached by local processors, whether those cache lines are owned by this or a different node, and tracking all cache lines owned by this node that have been cached by another node. Based upon the indication of the source of the requested data for a memory request, the results of the lookup to the coherence directory also operate as a prerequisite on the early coherence indication, as a memory request that has been requested for an address or cache line that is owned by another node will typically be canceled and retried at a later time.

From the perspective of data flow, FIG. 4 illustrates an incoming processor bus read request that is supplied to each of control logic 82, collision detection block 86, coherence directory 80, and memory interface 60. In the illustrated embodiment, the read request is treated as a speculative request, i.e., a fastpath request, by the memory interface 60, resulting in the memory request being forwarded to the memory subsystem prior to completing any lookup to the coherence directory.

As also seen in FIG. 4, collision detection block 86 and coherency directory 80 are capable of supplying collision and directory cancel signals to each of control logic 82 and memory interface 60, which signals are asserted whenever it is determined that a collision has occurred or the source of the requested data is such that the current memory request must be canceled and retried. Coherence directory 80 also outputs directory results to control logic block 82, which are used to update the PQ entry for the request.

Based upon the aforementioned input signals control logic 82 selectively outputs an early coherence indication when it is known that a given request will complete, and thus, will not need to be retried. This indication is supplied to processor bus interface 60, along with a data return signal generated by memory interface 62 whenever the requested data has become available. Based upon these two signals, processor bus interface 60 is able to notify the processor bus interface to initiate transmission of the return data over the processor bus. Furthermore, transfer of the return data to the processor may result in the provision of an indication from the processor bus interface to control logic 82 that the transfer has been initiated.

Figure 5:
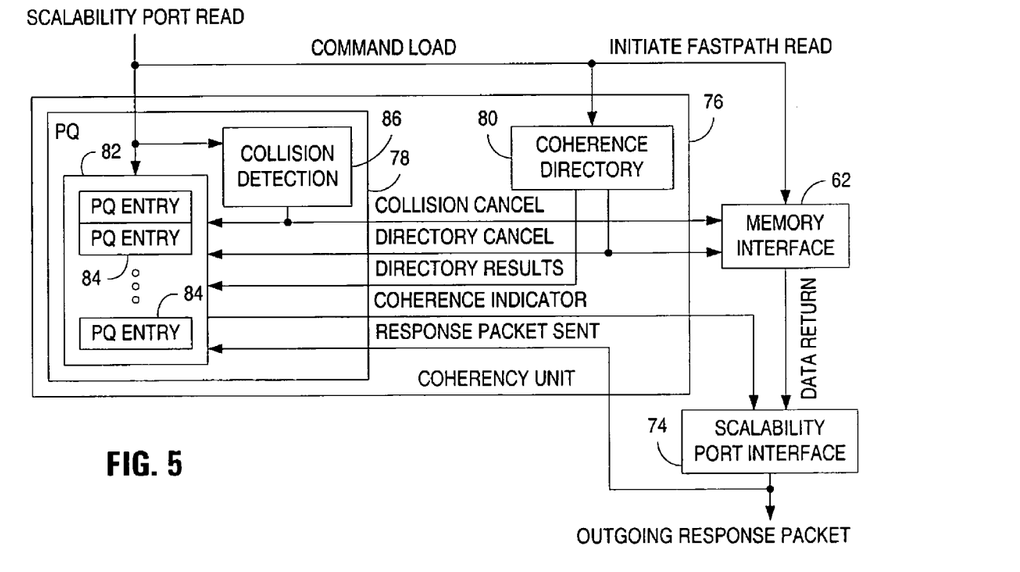
FIG. 5 is a block diagram illustrating the interconnections between the coherency unit, memory interface and scalability port interface in the chipset of FIG. 3.

FIG. 5 next illustrates in greater detail the interconnections between coherency unit 76, memory interface 62, and scalability port interface 74 in chipset 58, specifically with regard to handling scalability port memory requests forwarded to the chipset over the scalability port. As can be noted in the figure, the same components in coherency unit 76, namely pending queue 78 and coherence directory 80, are used to handle requests originated by a remote node via the scalability port, in much the same manner as processor-initiated memory requests. Specifically, coherency unit 76 operates on scalability port initiated memory requests in essentially the same manner as for processor-initiated memory requests by providing an early coherence indicator to scalability port interface 74 in response to a collision cancel signal, a directory cancel signal and directory results from coherence directory 80. Scalability port interface 74 is responsive to the early coherency indication and data return signal from memory interface 62 to formulate and output the requested data in a packet format. As noted above, due to the early indication of coherence, embodiments consistent with the invention often may construct at least a portion of a data return or response packet prior to the data being available to the scalability port interface, e.g., to add header and trailer information to return data, including information such as sequence numbers, source and destination identifiers, packet length, control bits, etc. Moreover, the scalability port interface will return to the pending queue an indication that the response packet has been sent over the scalability port interface.

Figure 6:
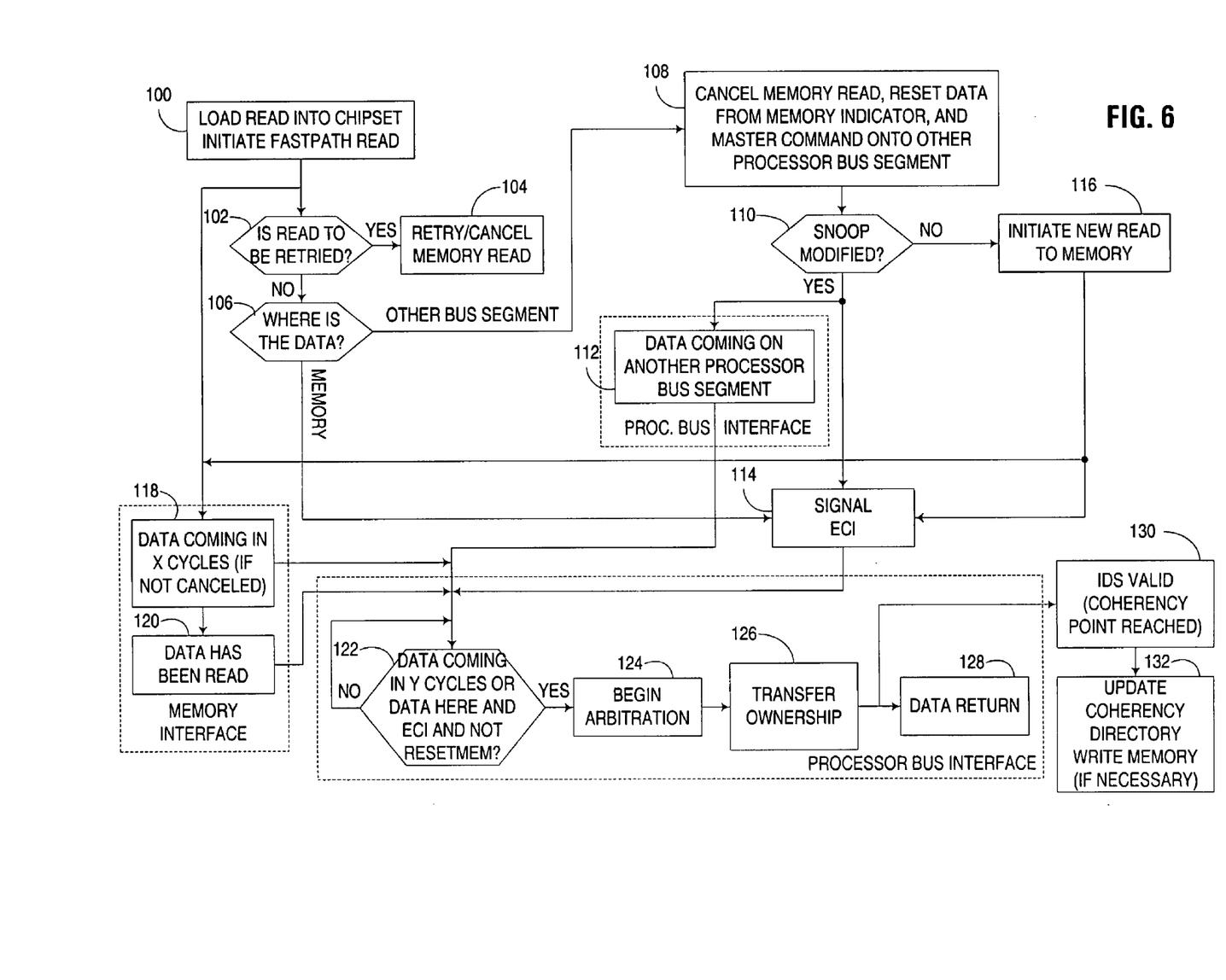
FIG. 6 is a flowchart illustrating the handling of a processor read request in the chipset of FIG. 3.

FIG. 6 next illustrates an exemplary flowchart for handling a processor read request in the chipset of FIG. 3. The flowchart illustrates the steps that occur in association with handling both a processor read request that results in a simple memory fetch and a processor read request that results in an intervention by another processor on the other processor bus. It should be noted that in the flowchart of FIG. 6, blocks 118 and 120 are implemented by memory interface 62, blocks 112 and 122-128 are implemented by processor bus interface 60, and the remaining blocks are implemented by control logic 82. The reader may wish to refer to FIG. 4 in association with the discussion of FIG. 6.

As shown in block 100, a read request is initially loaded into the chipset, which may include initiating a fastpath (speculative) read on the memory interface, whereby at this point, the control logic has a cancel opportunity due to address collisions (detected by collision detector 86), or due to the read request being directed to a cache line resident on another node (detected by coherence directory 80). In addition, the control logic may also determine a read request needs to be canceled due to buslocks or livelock avoidance. As such, block 102 determines whether the read request will be retried (i.e., will not complete). If so, control passes to block 104, whereby the read request is canceled and the command is retried back to the source. Handling of the read request is then complete.

Otherwise, control passes to block 106 to determine from the coherency directory the source of the requested data. Assuming a scenario where the source of the requested data is the local memory for the node, control passes to block 114 to signal an early coherence indicator (ECI), indicating to the processor bus interface that the data to be returned from memory can be used when it becomes available.

From the perspective of the memory interface, initiation of the fastpath read in block 100 initiates an indication from block 118 to the processor bus interface that data will be arriving to the chipset from the memory subsystem in a fixed (X) number of cycles (assuming the request is not canceled). The indication is typically asserted when the memory interface issues the command on the memory bus. Thereafter, in block 120, once the data does arrive at the chipset, another indication is provided by the memory interface to the processor bus interface.

Turning now to block 122, which is performed by the processor bus interface, the processor bus interface waits on the indications from the control logic and the memory interface, until both the ECI is asserted and either of the indications from blocks 118 and 120 is also asserted. Block 122 is also dependent upon a memory reset not occurring (e.g., as may be set in block 108 when a memory read in canceled), which notifies the processor bus interface to ignore any data already seen for the request and start looking for new data (e.g., if data is returned prior to receiving directory results that indicate the requested data should not be sourced from the local memory). Of note, block 122 may wait until a different (e.g., shorter) number (Y) of cycles than X cycles remain until the data will arrive from the memory interface. Once these conditions are met, block 122 passes control to block 124 to begin arbitration for the processor bus at an appropriate amount of cycles before the data will arrive (which is computed based upon the bus protocol) to initiate the data return. It should also be appreciated that, during this time, the control logic will hold off any subsequent requests that collide with the request.

Next, control passes to block 126 to transfer ownership of the requested data (typically the cache line with which the data is associated) from the chipset to the requesting processor. For example, depending upon the protocol supported, the transfer may be performed during a deferred snoop phase or during an IDS (identification strobe) phase, or in another manner suitable for the particular protocol. Next, as illustrated in block 128, as data is returned from memory, the data typically flows into a central data buffer in the chipset, and optionally directly into a buffer in the processor bus interface as well, to preserve the data in case the processor interface buffers are full. Due to the early arbitration allowed by the early coherence indicator, the processor bus interface is able to take the data and drive it out on the processor bus with minimal buffering.

Also, as shown in block 130, as data is returned to the source processor over the processor bus, the processor bus interface provides an IDS valid notification to the control logic that the transfer of ownership for the requested data has occurred, and that the directory state should now be updated in the coherency directory. Block 132 then updates the coherency directory, and writes the cache line to the local cache if necessary. Processing of the read request is then complete.

Returning now to block 106, assuming a scenario where the source of the requested data is a processor on another processor bus (or bus segment) in the node, control instead passes to block 108 to cancel the memory read and reset an indicator that indicates that the data will be coming from memory. In addition, block 108 masters a command onto the appropriate processor bus to initiate the retrieval of the return data from the appropriate processor within which the return data resides.

Upon mastering the command on the other bus, a snoop will be performed by the processors on the bus to obtain the state of the requested cache line. If the cache line is in any other state than modified, control passes to block 116 to simply initiate a new read to the memory, as the exemplary embodiment is configured to implement modified intervention, where a processor only intervenes when that processor has the cache line in a modified state. It will be appreciated that other intervention protocols may be supported in other embodiments.

Upon completion of block 116, control passes to block 114 to assert the ECI, as well as to initiate the read on the memory bus via block 118. The memory request will then be handled in the basic manner described above for a request initially determined to be sourced by the memory.

Returning to block 110, if it is determined that a processor has a modified copy of the cache line, control is passed to block 114 to signal the ECI. Moreover, as illustrated in block 112, the processor bus interface provides a data indicator to the processor bus for the requesting processor that data will be arriving in a fixed number of cycles. Block 122 thereafter initiates the data return once receiving the ECI and the indication from the other processor bus, and processing of the read request proceeds in a similar manner as for a request sourced by memory, but with the other processor bus providing the return data to the central data buffer, and optionally the requesting processor bus interface buffer. Also, as with a request sourced by memory, due to the early arbitration allowed by the early coherence indicator, the processor bus interface is able to take the data and drive it out on the requesting processor bus with minimal buffering.

Figure 7:
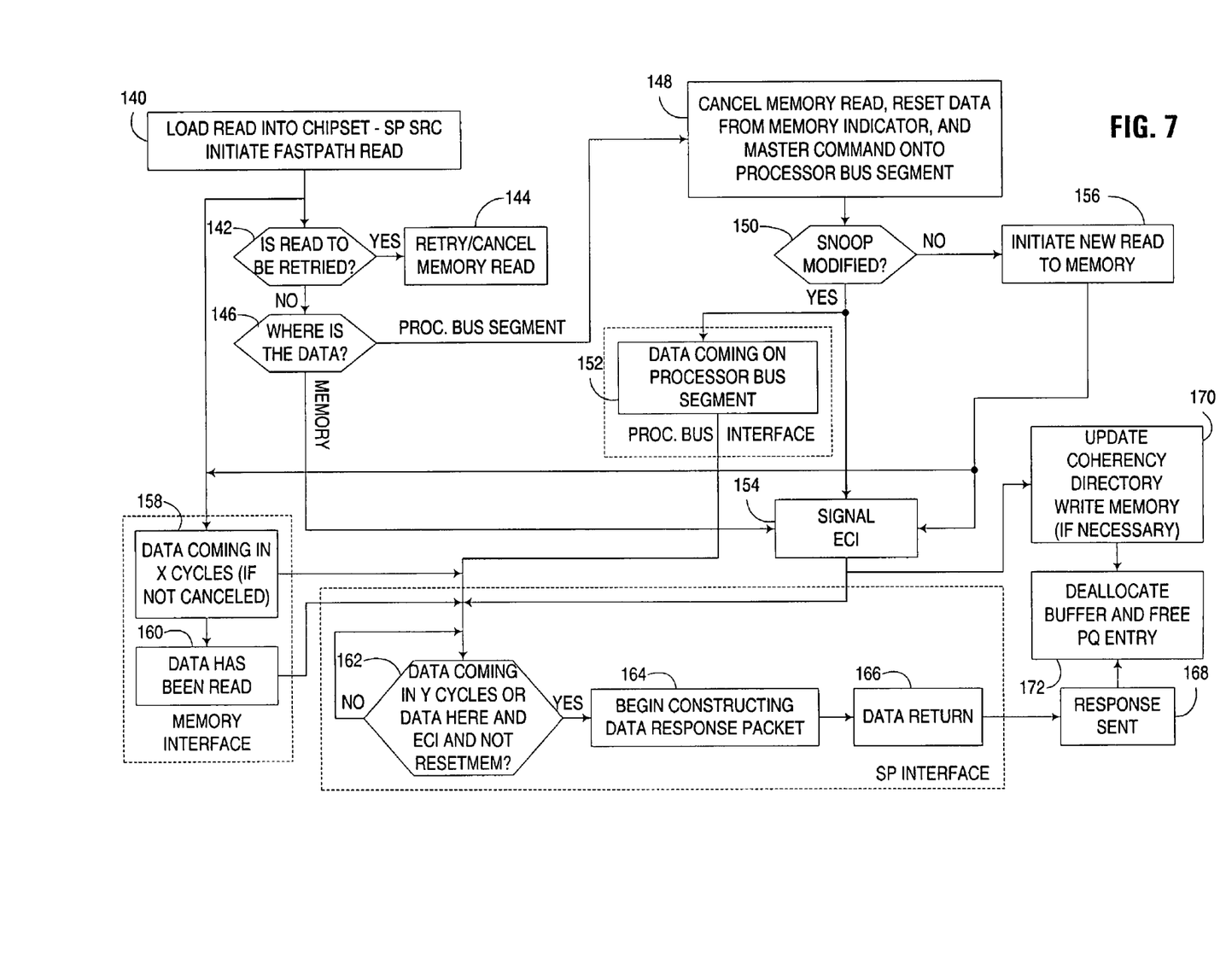
FIG. 7 is a flowchart illustrating the handling of a scalability port read request in the chipset of FIG. 3.

FIG. 7 next illustrates an exemplary flowchart for handling a read request received from the scalability port in the chipset of FIG. 3. The flowchart illustrates the steps that occur in association with handling both a read request that results in a simple memory fetch and a read request that results in the data being returned by a processor on a processor bus in the node. The flowchart of FIG. 7 proceeds in much the same manner as the flowchart of FIG. 6. It should also be noted that in the flowchart of FIG. 7, blocks 158 and 160 are implemented by memory interface 62, block 152 is implemented by processor bus interface 60, and blocks 162-166 are implemented by scalability port interface 674, with the remaining blocks implemented by control logic 82. The reader may wish to refer to FIG. 5 in association with the discussion of FIG. 7.

As shown in block 140, a read request is initially loaded into the chipset, which may include initiating a fastpath (speculative) read on the memory interface, whereby at this point, the control logic has a cancel opportunity due to address collisions (detected by collision detector 86). In addition, the control logic may also determine a read request needs to be canceled due to buslocks or livelock avoidance. As such, block 142 determines whether the read request will be retried (i.e., will not complete). If so, control passes to block 104, whereby the read request is canceled and the command is retried back to the source. Handling of the read request is then complete.

Otherwise, control passes to block 146 to determine from the coherency directory the source of the requested data. Assuming a scenario where the source of the requested data is the local memory for the node, control passes to block 154 to signal an early coherence indicator (ECI), indicating to the scalability port interface that the data to be returned from memory can be used when it becomes available.

From the perspective of the memory interface, initiation of the fastpath read in block 140 initiates an indication from block 158 to the scalability port interface that data will be arriving to the chipset from the memory subsystem in a fixed (X) number of cycles (assuming the request is not canceled). The indication is typically asserted when the memory interface issues the command on the memory bus. Thereafter, in block 160, once the data does arrive at the chipset, another indication is provided by the memory interface to the scalability port interface.

Turning now to block 162, which is performed by the scalability port interface, the scalability port interface waits on the indications from the control logic and the memory interface, until both the ECI is asserted and either of the indications from blocks 158 and 160 is also asserted. Block 162 is also dependent upon a memory reset not occurring (e.g., as may be set in block 148 when a memory read in canceled), which notifies the scalability port interface to ignore any data already seen for the request and start looking for new data (e.g., if data is returned prior to receiving directory results that indicate the requested data should not be sourced from the local memory). Of note, block 162 may wait until a different (e.g., shorter) number (Y) of cycles than X cycles remain until the data will arrive from the memory interface. Once these conditions are met, block 162 passes control to block 164 to begin constructing a data response packet for transmission over the scalability port link at an appropriate amount of cycles before the data will arrive (which is computed based upon the bus protocol) to initiate the data return. It should also be appreciated that, during this time, the control logic will hold off any subsequent requests that collide with the request.

Next, in block 166, as data is returned from memory, the data typically flows into a central data buffer in the chipset, and optionally directly into a buffer in the scalability port interface as well, to preserve the data in case the scalability port interface buffers are full. Due to the early arbitration allowed by the early coherence indicator, the scalability port interface is able to take the data and place it in the outgoing data response packet with minimal buffering.

Next, as shown in block 168, once the data response packet has been sent, an indication as such is forwarded to the control logic. In addition, as shown in block 170, separate from the notification that the data response packet has been sent, once the ECI has been signaled in block 154, the control logic updates the coherency directory, and writes the cache line to the local cache if necessary. Once block 170 completes and the notification is received in block 168, block 172 then deallocate any buffers and free the PQ entry for the packet. Processing of the request is then complete.

Returning now to block 146, assuming a scenario where the source of the requested data is a processor in the node, control instead passes to block 148 to cancel the memory read and reset an indicator that indicates that the data will be coming from memory. In addition, block 148 masters a command onto the appropriate processor bus to initiate the retrieval of the return data from the appropriate processor within which the return data resides.

Upon mastering the command on the processor bus, a snoop will be performed by the processors on the bus, typically resulting in an indication being returned indicating either that the requested cache line is in an exclusive (or modified) state on one processor, or that the requested cache line is in a shared (or non-modified) state. If the latter is received, indicating that the processor does not have a modified or exclusive copy of the cache line, control passes to block 156 to simply initiate a new read to the memory, as the exemplary embodiment is configured to allow one processor to intervene only when that processor has exclusive or modified access to the cache line. In that event, block 156 passes control to block 154 to assert the ECI, as well as to initiate the read on the memory bus via block 158. The memory request will then be handled in the basic manner described above for a request initially determined to be sourced by the memory.

If, on the other hand, block 150 determines that a processor has an exclusive or modified copy of the cache line, control is passed to block 154 to signal the ECI. Moreover, as illustrated in block 152, the processor bus interface provides a data indicator to the scalability port interface that data will be arriving in a fixed number of cycles. Block 162 thereafter initiates the data return once receiving the ECI and the indication from the processor bus, and processing of the read request proceeds in a similar manner as for a request sourced by memory, but with the processor bus providing the return data to the central data buffer, and optionally the scalability port interface buffer. Also, as with a request sourced by memory, due to the early arbitration allowed by the early coherence indicator, the scalability port interface is able to line up the data with writing the data into the response packet, resulting in minimal buffering required for the data response.

Speculative creation of the data response packet by the scalability port interface, and early arbitration of a processor bus, provides additional benefits consistent with the invention. For example, when the data is being returned from memory, the data may be allowed to flow into the scalability port or processor bus interface buffer without being ECC corrected. If no ECC error or correction occurs the data is correct as soon as it is received, and can be driven directly to the requester. If an ECC error or correction occurs, a signal may still be sent from the memory interface to the scalability port interface just in time to "stomp" or discard the packet prior to transmission, e.g., in its last cycle. The packet may then be restarted at a later time, using corrected data from the central buffer. Likewise, when data is being returned to a source processor on the same node, a signal may be sent from the memory interface to the processor bus interface to enable the processor bus interface to stall the data return for one or more cycles, as required to receive the corrected data.

In addition, when the data is being returned over a processor bus, the "data coming" indication may be provided based upon a data transfer signal such as the TRDY signal used in the Intel Xeon bus protocol. A minimum architected time may be specified from the TRDY signal to data on the processor bus; however, it may be desirable to allow the processor to take longer than the minimum time to supply the data. In the case where the data does not arrive according to minimum timings, it may be desirable to discard the packet and then restart the packet at a later time when the data is known to be in the central buffer (if being routed to the scalability port interface), or to stall the data return for one or more cycles (if being routed to the processor bus interface).

Therefore, it will be appreciated that the provision of an early coherence indication reduces the latency of read requests, and enables coherence directory updates to be removed from the critical path for processing such read requests. It will be appreciated that various additional modifications may be made to the illustrated embodiments consistent with the invention. It will also be appreciated that implementation of the functionality described above within logic circuitry disposed in a chipset or other appropriate integrated circuit device, would be well within the abilities of one of ordinary skill in the art having the benefit of the instant disclosure.

What is claimed is:

1. A method of processing a request for data in a data processing system of the type including a communications interface configured to communicate return data over a communications link in response to the request, the method comprising, in response to the request:
   accessing coherency information stored in a coherency directory to identify a source of return data for the request;
   updating the coherency directory based upon the request;
   prior to updating the coherency directory, indicating to the communications interface that the return data can be used by the communications interface when received thereby from the source of the return data, wherein indicating that the return data can be used is performed in response to determining that the request will complete; and
   in the communications interface, preparing for communication of the return data over the communications link in response to the indication, and prior to the return data being available to the communications interface, wherein preparing for communication of the return data comprises arbitrating for the communications link to line up the return data.

2. The method of claim 1, wherein the communications interface and the coherency directory are disposed in a first node in a multi-node data processing system, wherein the communications interface comprises an internodal interface configured to couple the first node to a second node, and wherein the request is generated by the second node and received by the internodal interface.

3. The method of claim 2, wherein the internodal interface comprises a scalability port interface.

4. The method of claim 1, wherein preparing for communication of the return data includes initiating construction of a data response packet.

5. The method of claim 4, wherein preparing for communication of the return data further comprises discarding the data response packet and restarting the data response packet at a later time in response to determining that the availability of the return data to the communications interface will be delayed.

6. The method of claim 1, wherein the communications interface comprises a processor bus interface configured to be coupled to at least one processor over a processor bus, wherein the request is generated by the processor and received by the processor bus interface.

7. The method of claim 1, further comprising a memory interface configured to be coupled to a memory, wherein the coherency directory is configured to indicate whether the memory is the source of the return data for the request.

8. The method of claim 1, wherein the communications interface further comprises a second processor bus interface configured to be coupled to at least one additional processor over a second processor bus, wherein the coherency directory is configured to indicate whether the additional processor is the source of the return data for the request.

9. The method of claim 1, wherein the indication to the communications interface comprises an early coherence indicator.

10. The method of claim 1, wherein determining that the request will complete is based at least in part upon accessing the coherency information.

11. The method of claim 1, wherein determining that the request will complete is based at least in part upon detecting an absence of an address collision with another request.

12. The method of claim 1, wherein the request is a speculative read request.

13. The method of claim 1, wherein updating the coherency directory is independent of enabling the communications interface to communicate the return data over the communications link.

14. The method of claim 1, wherein indicating to the communications interface that the return data can be used by the communications interface when received thereby from the source of the return data comprises generating an indication to the communications interface without waiting to receive a confirmation from the coherency directory that the coherency directory has been updated.

15. A method of processing a request for data in a data processing system of the type including a communications interface configured to communicate return data over a communications link in response to the request, the method comprising, in response to the request:
   accessing coherency information stored in a coherency directory to identify a source of return data for the request;
   updating the coherency directory based upon the request;
   prior to updating the coherency directory, indicating to the communications interface that the return data can be used by the communications interface when received thereby from the source of the return data, wherein indicating that the return data can be used is performed in response to determining that the request will complete; and
   in the communications interface, preparing for communication of the return data over the communications link in response to the indication, and prior to the return data being available to the communications interface, wherein preparing for communication of the return data comprises delaying communication of the return data over the communications interface in response to an early data indicator provided thereto after receiving the indication that the return data can be used by the communications interface.

16. A method of processing a request for data in a chipset disposed in a data processing system, wherein the chipset includes a processor bus interface configured to be coupled to at least one processor over a processor bus, wherein the request is generated by the processor and received by the processor bus interface, and wherein the processor bus interface is configured to communicate return data to the processor over the processor bus in response to the request, the method comprising, in response to the request:
   accessing coherency information stored in a coherency directory in the chipset to identify a source of return data for the request;
   updating the coherency directory based upon the request;
   prior to updating the coherency directory, indicating to the processor bus interface that the return data can be used by the processor bus interface when received thereby from the source of the return data, wherein indicating that the return data can be used is performed in response to determining that the request will complete; and
   in the processor bus interface, preparing for communication of the return data to the processor in response to the indication, and prior to the return data being available to the processor bus interface, by arbitrating for the processor bus to line up the return data prior to the return data being available to the processor bus interface.

17. A method of processing a request for data in a first node among a plurality of nodes in a multi-node data processing system, the first node including an internodal interface configured to couple the first node to a second node, the method comprising, in response to receiving the request from the second node over the internodal interface:
   accessing coherency information stored in a coherency directory resident in the first node to identify a source of return data for the request;
   updating the coherency directory based upon the request;
   prior to updating the coherency directory, indicating to the internodal interface that the return data can be used by the internodal interface when received thereby from the source of the return data, wherein indicating that the return data can be used is performed in response to determining that the request will complete; and
   in the internodal interface, preparing for communication of the return data to the second node in response to the indication, and prior to the return data being available to the internodal interface, by initiating construction of a data response packet prior to the return data being available to the internodal interface.

* * * * *